United States Patent
Hanusiak et al.

(10) Patent No.: US 8,177,934 B2
(45) Date of Patent: May 15, 2012

(54) ROTOCAST COMPOSITE HYBRID PROCESS FOR MOLDING COMPOSITE PARTS

(75) Inventors: Lisa B. Hanusiak, Windermere, FL (US); Zaw Myat, Kissimmee, FL (US)

(73) Assignee: Disney Enterprises, Inc., Burbank, CA (US)

( * ) Notice: Subject to any disclaimer, the term of this patent is extended or adjusted under 35 U.S.C. 154(b) by 107 days.

(21) Appl. No.: 12/795,387

(22) Filed: Jun. 7, 2010

(65) Prior Publication Data
US 2011/0297296 A1 Dec. 8, 2011

(51) Int. Cl.
*B28C 1/20* (2006.01)

(52) U.S. Cl. ........ 156/245; 156/242; 264/310; 264/311; 425/429

(58) Field of Classification Search .................. 425/428, 425/429; 264/310, 311
See application file for complete search history.

(56) References Cited

U.S. PATENT DOCUMENTS

| | | | | |
|---|---|---|---|---|
| 3,314,639 A | * | 4/1967 | Barnett | 249/58 |
| 4,104,357 A | * | 8/1978 | Blair | 264/255 |
| 6,131,700 A | * | 10/2000 | Farner | 182/222 |
| 6,352,658 B1 | | 3/2002 | Chang et al. | |
| 6,432,543 B2 | | 8/2002 | Harrison et al. | |
| 6,649,107 B2 | | 11/2003 | Harrison et al. | |
| 6,852,403 B2 | | 2/2005 | Harrison et al. | |
| 2005/0230878 A1 | * | 10/2005 | Anderson | 264/239 |

FOREIGN PATENT DOCUMENTS

| | | | |
|---|---|---|---|
| DE | 19643895 A1 | * | 5/1997 |
| EP | 12732 A1 | * | 6/1980 |
| FR | 2163380 A | * | 7/1973 |
| GB | 1381863 A | * | 1/1975 |

OTHER PUBLICATIONS

Machine translation of Naphtachimie (FR-2163380A), Jul. 1973, 1 page.*
Machine translation of Matynia (DE-19643895A1), May 1997, 1 page.*

* cited by examiner

*Primary Examiner* — Philip Tucker
*Assistant Examiner* — William Bell
(74) *Attorney, Agent, or Firm* — Marsh Fischmann & Breyfogle LLP; Kent A. Lembke (57) ABSTRACT

A rotocast composite hybrid method for efficiently making strong but lightweight parts. The method includes filling a mold with a volume of resin through an access port and then sealing the access port by positioning a lid over the access port. The method includes mounting the mold in a rotocasting machine and then operating the rotocasting machine to rotate the mold about two orthogonal axes until a layer of the resin is applied uniformly over an inner surface of the mold to form an outer wall of a part. The method includes removing the lid and then applying a reinforcement material (e.g., sheets of woven fiberglass) to an inner surface of the outer wall of the part through the access port. The applying of the reinforcement material also involves wet layup such as by binding the reinforcement material to the inner surface by applying additional resin to the reinforcement material.

16 Claims, 10 Drawing Sheets

ROTOCAST COMPOSITE HYBRID PROCESS FOR MOLDING COMPOSITE PARTS

BACKGROUND

1. Field of the Description

The present description relates, in general, to methods of fabricating lightweight, high-strength plastic or elastomeric products, and, more particularly, to a method for utilizing a rotocast composite hybrid process to mold a composite or multi-layer product or part, such as a three-dimensional hollow part, that has improved strength and stiffness and is lighter weight than typical molded pieces produced using rotocasting processes and less expensive than a typical composite part.

2. Relevant Background

There are many applications for lightweight, higher strength products that are formed of a plastic such as an elastomer (e.g., urethane or the like). In one specific example, costumes worn by actors in theatrical and theme park settings are often formed using molding techniques. The costumes may be worn for long periods of time in higher temperature settings such as under bright lights or under the Sun in the summer. To avoid actor fatigue, it is desirable to make the costume components as lightweight (e.g., thin) as practical while still providing a relatively strong and durable costume that can be worn many times. However, the processes/techniques described herein may be used to form any three-dimensional hollow shape where the performance of a composite is desired but at a lower cost.

Composite materials, such as reinforced plastics made of a combination of materials including a binder or reinforcing constituent blended into the base material prior to molding, can be used in some cases for molding costume elements and other parts. Composites are useful as they can be used to mold strong, stiff, and lightweight products. Unfortunately, cost is often a limiting factor for many products, and composites are often relatively expensive, making them prohibitively expensive for many applications. Another problem with the use of composites may be mold parting lines and a need for body work and painting to achieve a desired appearance. For example, a three-dimensional element may be molded out of composite in multiple sections that are tied together in a secondary step that results in parting lines. The gel coating requires painting, which can be expensive, and the parting lines need an extensive amount of body work prior to painting so as to produce an acceptable quality surface. These additional steps further drive up the cost of the composite part. Also, a painted part will require periodic painting or maintenance to retain an acceptable appearance. Some of the resins used with this process may enable the finished color to be pigmented into the skin, eliminating the need for painting.

Parts or products may also be formed using more economical processes such as rotocasting (or rotomolding). In a typical rotocasting process, a two-part mold (or mold formed by two mating halves) of a product is produced that has a small fill hole or sealable inlet. A two-part resin, such as epoxy, polyurethane, or polyester, is mixed and then injected through the fill hole into the interior chamber or volume of the mold. The mold is supported within a rotocaster or rotocasting machine, and the rotocasting machine is operated to rotate the filled mold along both the X and Y axes to produce a coating of uniform thickness on the inner surfaces of the mold. After curing, the mold is opened and the molded part is removed for use or for further processing such as sanding to remove part lines and painting to provide a desired outer appearance or color. While rotocasting of parts is economical, the resulting parts are often not very strong or, if thick enough to be strong, are not very lightweight. An un-reinforced plastic will also not have the stiffness of a composite, which provides better shape retention of a three-dimensional object, particularly when used in a warm environment.

Hence, there remains a need for an improved method of forming lightweight and strong/durable three-dimensional parts or elements that also controls material, manufacturing/finishing, and maintenance costs. Preferably, such a method would provide parts or products with relatively thin walls and would be adaptable to limit the need for painting and/or other post-curing processing.

SUMMARY

The following description teaches a rotocast composite hybrid process that offers a compromise between economy and performance (e.g., achieves some of the economy of the rotocasting process, yet has some of the physical property advantages of a composite). Parts or components, such as lightweight three-dimensional hollow parts, may be produced using the hybrid rotocasting composite process in one fourth to one half of the time required for conventional multi-layer (or "composite") layup processes. The weight reduction and the strength increase provided by an interior layer of reinforcing woven fabric (or simply "reinforcement") provide high performance or strength desirable for many parts or products. The rotocast composite hybrid process may also be used to provide molded-in color in the outer wall or skin coat/layer that provides a cost savings in initial fabrication and also in the maintenance required for upkeep in multi-use or longer-term use parts.

Briefly, the rotocast composite hybrid method described herein calls for providing a three-dimensional mold shell or inner mold element that defines a mold chamber or interior space (e.g., outer shape of a molded part). The mold shell has an access port or opening large enough to admit a hand for application of a reinforcement fabric, rather than a small, sealable injection hole solely used for introduction of liquid resin, which allows the reinforcement layer such as one or more plies of a woven reinforcement fabric (e.g., woven carbon fiber, fiberglass, cotton fabric, or the like) to be inserted after an initial skin rotocasting step (e.g., an opening with a 5 to 7-inch or larger diameter). The rotocast composite hybrid method allows a user to rotocast a thin skin (or skin coat) or outer wall for a part and such a thin skin may be formed in a desired finish color or other casting effect such as glitter or pearlescent powder so as to eliminate the need for painting as a finishing step. A volume of resin is placed in the chamber or interior volume of the mold shell through the access port, and then rotocasting is performed for a period of time (e.g., rotation in both X and Y axes with a rotocasting machine supporting the sealed mold shell with the inserted resin).

Once the skin coat has gelled (but not cured), the access port of the tool or shell is opened, and a ply or two of woven reinforcement or other reinforcement material is applied to the inside surface of the outer shell or skin coat. An application of a two-part resin (e.g., polyurethane, epoxy of polyester, or the like) is used to wet out and bind the reinforcement layer to the outer wall surface. The assembled part is then allowed to cure and then is demolded. The result is a part that may be relatively strong while being thin (e.g., lightweight relative to its wall strength). If pigment is added to the resin used for the outer wall or skin coat, the part may also be a single color part that may only need an application of a clear coat or other small amounts of finishing to provide a readyto-use part/product. In the case of a multi-color part, the predominant color may be used as the base color, and the other finishing colors are air brushed onto the part prior to application of a clear coat.

More particularly, a rotocast composite hybrid method is provided for making strong but lightweight (e.g., thin) parts that are three-dimensional elements that require stiffness, strength, heat resistance, and/or lightness. The method includes filling a mold with a volume of resin through an access port (e.g., an opening with a diameter of more than about 5 inches) and then sealing the access port by positioning a lid over the access port. The method also includes mounting the mold in a rotocasting machine (e.g., a device configured to rotate a mold in X and Y axes). The method includes operating the rotocasting machine to rotate the mold about two orthogonal axes. In this manner, a layer of the resin flows over an inner surface of the mold to form an outer wall of a part. The method also includes removing the lid and then applying a reinforcement material (e.g., sheets or circles of woven fiberglass, carbon, cotton fiber, or the like) to an inner surface of the outer wall of the part through the access port. The applying of the reinforcement material typically involves wet layup such as by binding the reinforcement material to the inner surface by applying an additional volume of the resin to the reinforcement material (e.g., wet the inner surface of the outer wall of the part with resin, apply sheets of fabric, and then apply another coat of the resin).

In some cases, the resin is a two-part resin with a gel time, and the rotocasting machine is rotated for a time period that is less than the gel time. In this way, the resin on the inner surface of the outer wall is soft but still tacky when the reinforcing material is attached or applied. The resin may be any two-part resin such as a polyurethane or epoxy, the rotation time (or rotocasting time period) is slightly longer than the gel time, such that the resin has stopped flowing but is still slightly tacky. In some embodiments of the method, the access port has a diameter of at least about 5 inches, and removing the lid includes removing a volume of the resin from the outer wall to form an opening in the outer wall to allow a worker access to apply the reinforcement material (and layup resin). If a smooth inner surface is required, the method may also include applying a layer of peel ply to the surface of the composite layup and, after curing of the resin, pulling the peel ply from the part to achieve a smooth internal surface in the part. The method further may include, after a cure period has elapsed, de-molding the part and applying a clear coat to outer surfaces of the outer wall. In some applications, the volume of resin used to form the outer wall may include (or have mixed in) pigment, glitter, or casting powders such that the outer wall has a molded-in color or other visual effect defined by the pigment or casting powder upon its curing to form the part (e.g., to avoid having to paint the part).

DETAILED DESCRIPTION

Briefly, the present description is directed toward a rotocast composite hybrid process that begins with providing a modified inner mold segment or shell for use in rotocasting. The inner mold segment is modified in the fact that it includes a relatively large access port or opening that can be used both for pouring liquid resin into an inner chamber and for later applying a reinforcement layer and wetting it out with additional resin. Once filled with a liquid resin for the skin coat or outer wall of the part, a lid or cover is attached to the inner mold segment to seal the access port, and the mold assembly is mounted within a rotocasting machine. The described process is "hybrid" in the fact that after the initial rotocasting step the lid or cover is removed prior to the outer wall/skin coat curing, and steps are performed to provide an inner reinforcing (composite) layer in the part. This may involve applying one or more plies/layers of a woven reinforcement fabric or mesh to the tacky but gelled inner surfaces of the rotocast outer wall and then further binding the reinforcement layer to the outer wall by applying a layer or coat of the same or a different resin than used for the outer wall (e.g., wetting out the reinforcement layer). Additional steps such as smoothing the inward facing surface of the inner wall may be performed, such as applying a peel ply, and, then, the part is allowed to cure to provide a molded part or product that can be removed from the inner mold segment (or de-molded).

Figure 1:
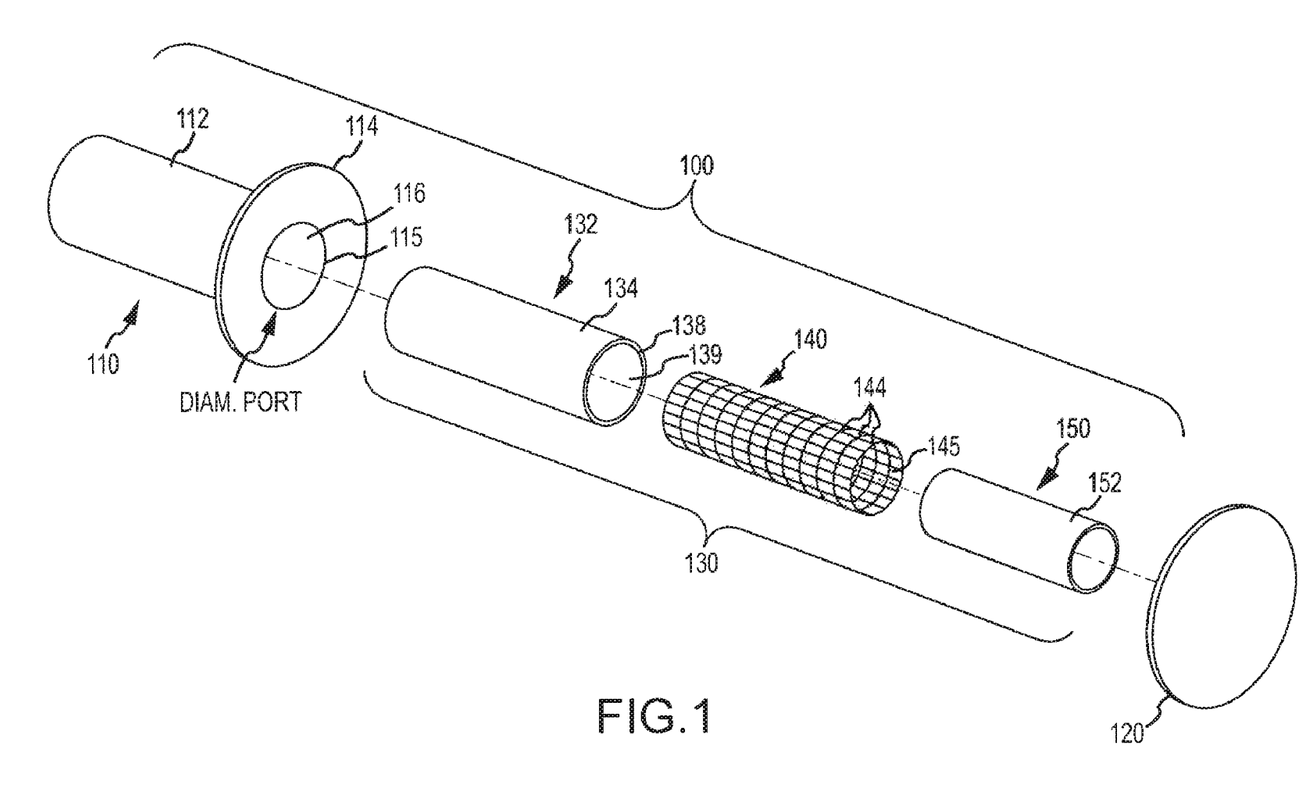
FIG. 1 is an exploded view of a mold assembly including a part or product molded using the rotocast composite hybrid process described herein to obtain a structurally reinforced components (e.g., a thin (lightweight) component with desired strength)

FIG. 1 illustrates an exploded view of an example of a three-dimensional mold assembly 100 showing portions or layers of a molded part formed according to an embodiment of a hybrid rotocasting process. The assembly 100 includes an inner mold segment (or tool or shell) 110 that includes a sidewall or sidewalls 112 with an inner surface 116 that defines a shape and surfaces for an outer wall or skin coat 132 for a part 130 molded with the inner mold segment 110.

At the other end, a mating plate or lip 114 (for the cover or lid 120) is provided that includes an access port or opening 115 providing access to the inner surface 116 (e.g., access to the chamber or interior volume of the mold shell or tool 110). The access port 115 may be circular in shape, but this is not required, and is large enough to allow an average worker or technician to insert their hand and/or tools into the chamber or interior of shell/tool 110 so as to apply a reinforcement layer 140 and binding layer/inner wall 150 to a rotocast outer wall 132 of a part 130. For example, the port 115 may be circular with a diameter, $Diam_{Port}$, of up to about 8 inches or more (e.g., 5 to 7 inches or the like) to provide adequate space for layup of the reinforcement layer 140 with inner coating/layer 150. To seal the inner mold segment 110 for rotocasting of wall 132, the assembly 100 includes a lid or cover 120 that is mated to the surfaces of the mating plate/lip 114, and the lid 120 may be clamped or otherwise bound to the plate/lip 114 to seal the access port 115 and to allow ready removal of the lid 120 for later steps of the rotocast composite hybrid process (e.g., application of reinforcement layer 140).

The molded part 130 is shown in exploded form as three separate components/layers: an outer wall/skin coat 132, a reinforcement layer (or, more simply, reinforcement) 140, and an inner wall/binding layer 150. In practice, as described herein, the reinforcement layer 140 is recessed into or pressed a depth into outer wall via inner surface 139 (e.g., applied when material of skin coat 132 is gelled but still tacky) and the inner wall/binding layer 150 will intermingle within the gaps in the fabric/mesh 144 of reinforcement 140 such that it binds with surface 139 of skin coat (e.g., the inner wall/binding layer 150 and reinforcement layer 140 may be thought of as a single composite layer bound to the inner surface 139 of skin coating 132).

During the hybrid rotocasting process using assembly 100, a volume of resin (such as a two-part epoxy or urethane) is mixed and poured through opening 115 and the lid 120 is attached. Then, the shell/tool 110 is mounted in a rotocasting machine that is operated for a predefined time period (e.g., a gelling period suited for the particular resin) to form the outer shell 132. The outer shell 132 forms a three-dimensional shape with a single opening. The outer wall 134 has a thickness defined by the volume of the resin poured into the shell 110 but, as discussed herein, may be relatively thin due to the later addition of reinforcement 140. At the end of the time period for rotocasting of skin coat 132, the rotocasting machine is stopped and the lid 120 is removed. This acts to remove a volume of the resin with the lid/cover 120 to form an opening 138 in the outer wall/skin coat 132, which provides access to the inner surface 139 of outer wall 134.

At this point in the process using assembly 100, a worker or technician may manually apply a ply or more of mesh/fabric 144 to provide a reinforcement layer 140 on the gelled but tacky surface 139 of outer wall 134. Access to the surface 139 is provided by the formed opening 138 and, significantly, by the access port 115 in the mold shell or tool 110. To fully bind the reinforcement 140 to the surface 139, the reinforcement 140 (or its mesh/woven fabric 144) has its inner surfaces 145 (e.g., the reinforcement 140 is basically a hollow structure similar in shape and size as outer wall 132) coated with a volume of resin (e.g., may be the same resin as used for outer wall 132 or a compatible but different resin). This forms a binding layer or inner wall 150 over the reinforcement 140 as shown by cylindrical (in this example but not required) inner wall 152. The layer 150 acts as a binder to bind together the reinforcement 140 and bind the reinforcement 140 to the outer wall 132. After curing, the part 130 can be de-molded from the tool 110 via access port 115 or, in the case of a multi-segment mold, by splitting the mold sections apart.

Figure 2A:
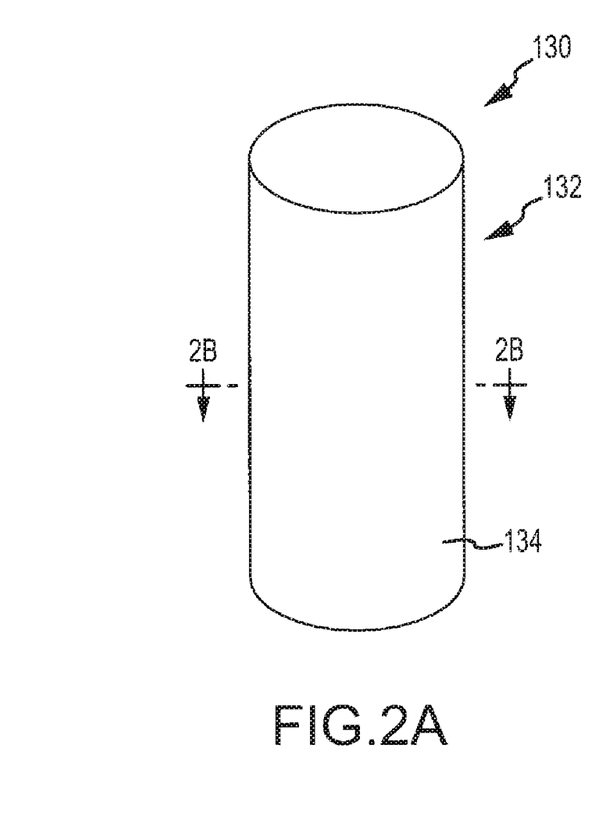
FIGS. 2A and 2B show a perspective view and sectional view, respectively, of the molded part of FIG. 1 illustrating the resulting multi-layer (or reinforced, composite) part.
Figure 2B:
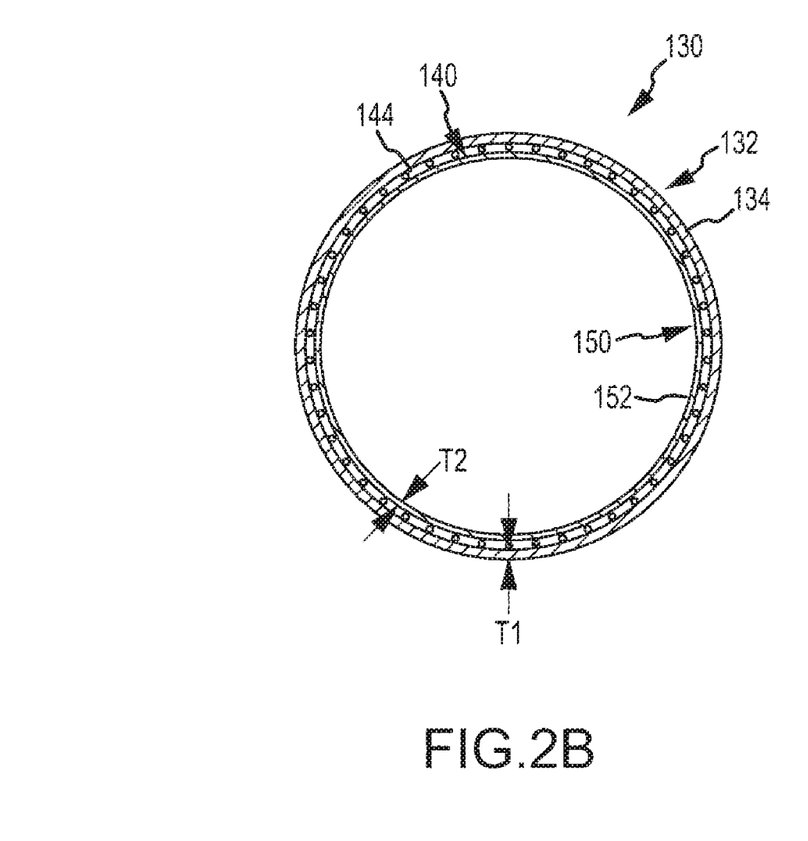

FIGS. 2A and 2B illustrate the product or part 130 fabricated according to a rotocast composite hybrid method described herein and after de-molding (or removal) from the shell or tool 110 of FIG. 1, e.g., after a curing period for resin in outer wall 132 and/or resin in binding/inner layer 150. As shown, the molded part 130 is a three-dimensional part that corresponds to tool 110. The outer surfaces of outer wall 132 including surfaces of sidewall 134 may have a molded-in color or visual effect when pigment, glitter, or casting powder is added to the resin poured into the chamber of tool/shell 110 to form the outer wall 132 or these surfaces may later be painted to achieve a desired color. Also, although not shown, a clear coat may be applied to achieve a desired sheen or finish.

As shown in FIG. 2B, the part/product 130 is generally made up of three layers or components rather than a single layer as typically found in conventional rotocasting. As shown, the layers or composite components include: the outer wall 132 including the sidewall 134 with a first thickness, $t_1$; the reinforcement layer or reinforcement 140 provided by mesh/fabric 144, which is typically relatively thin (e.g., much thinner than sidewall 134); and binding layer 150 including inner wall 152 with a second thickness, $t_2$. Again, in practice, portions of the material of layer 150 typically will be absorbed into the mesh/woven fabric 144 and mate with or bind to inner surfaces 139 of outer wall 134 (e.g., there may be basically one inner layer formed as a composite of reinforcement 140 and resin/material of binding layer 150). The thicknesses, $t_1$ and $t_2$, may be varied to practice the invention depending upon the material strength desired and/or the visual appearance of the skin desired. In one example, the thickness, $t_1$, of skin coating 132 is 1 to 3 millimeters, with the thickness, $t_2$, being much less (e.g., an overall built-up thickness of the part 130 being 20 to 125 thousandths or more when the materials used for molding and for binding of a woven reinforcement is, for example, a two-part polyurethane or epoxy). Upon curing, the material of the binding layer 150 is typically attached to the inner surfaces 139 (or material) of the outer wall 134 of the skin coat 132 such that there no longer appears to be discrete and separate layers.

Figure 3A:
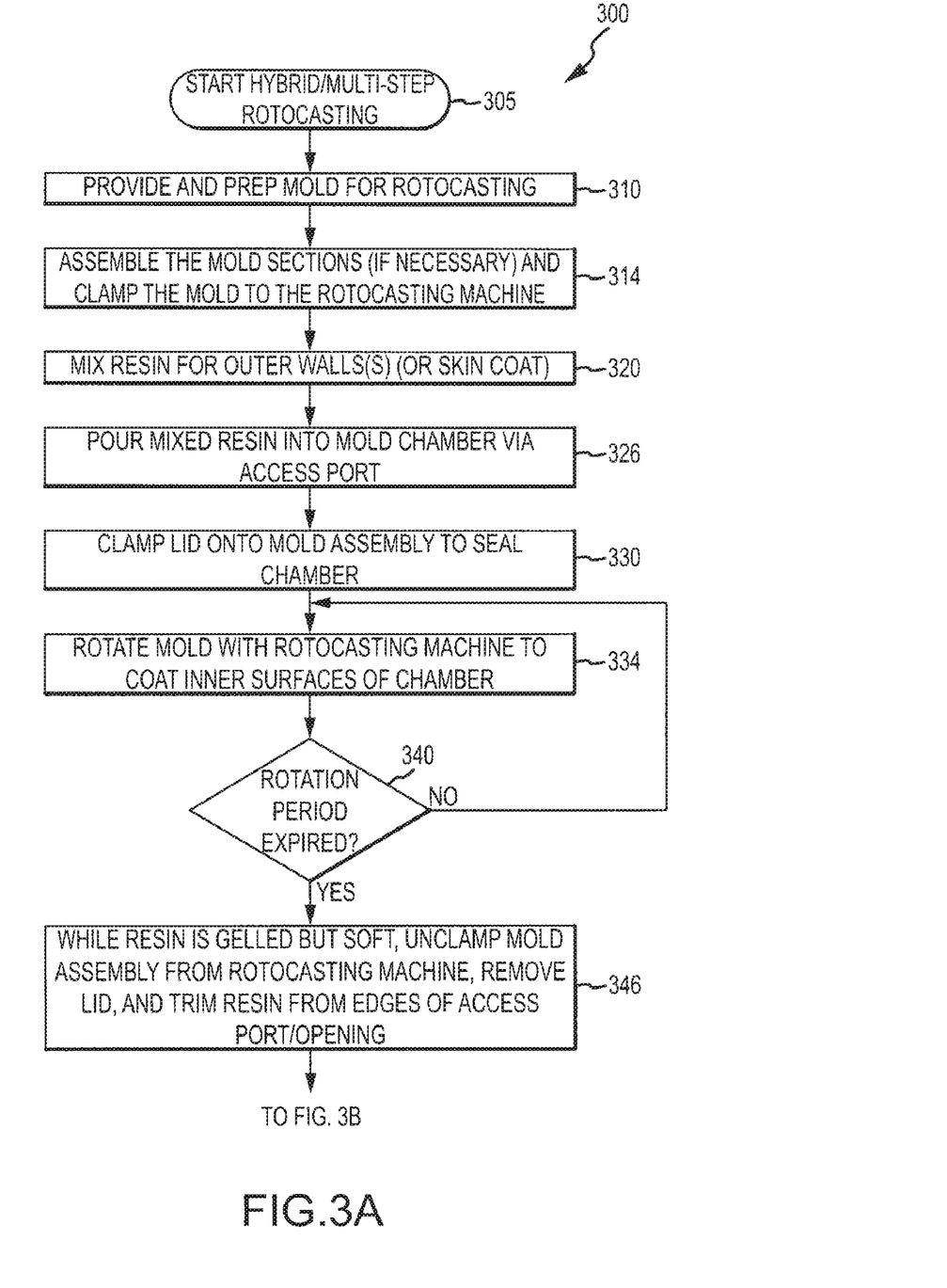
FIG. 3 illustrates a flow diagram for a rotocasting method according to one exemplary embodiment.
Figure 3B:
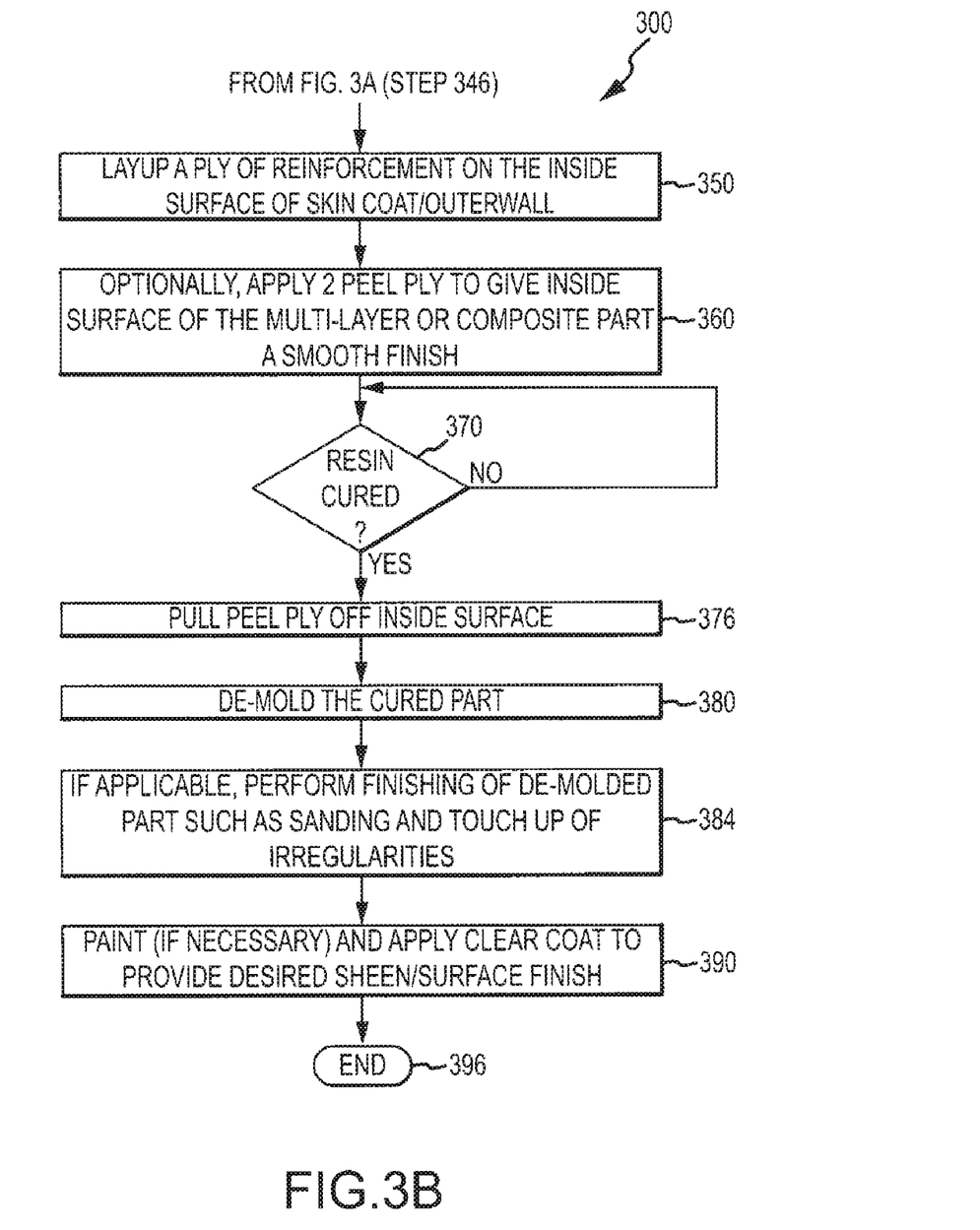
Figure 4:
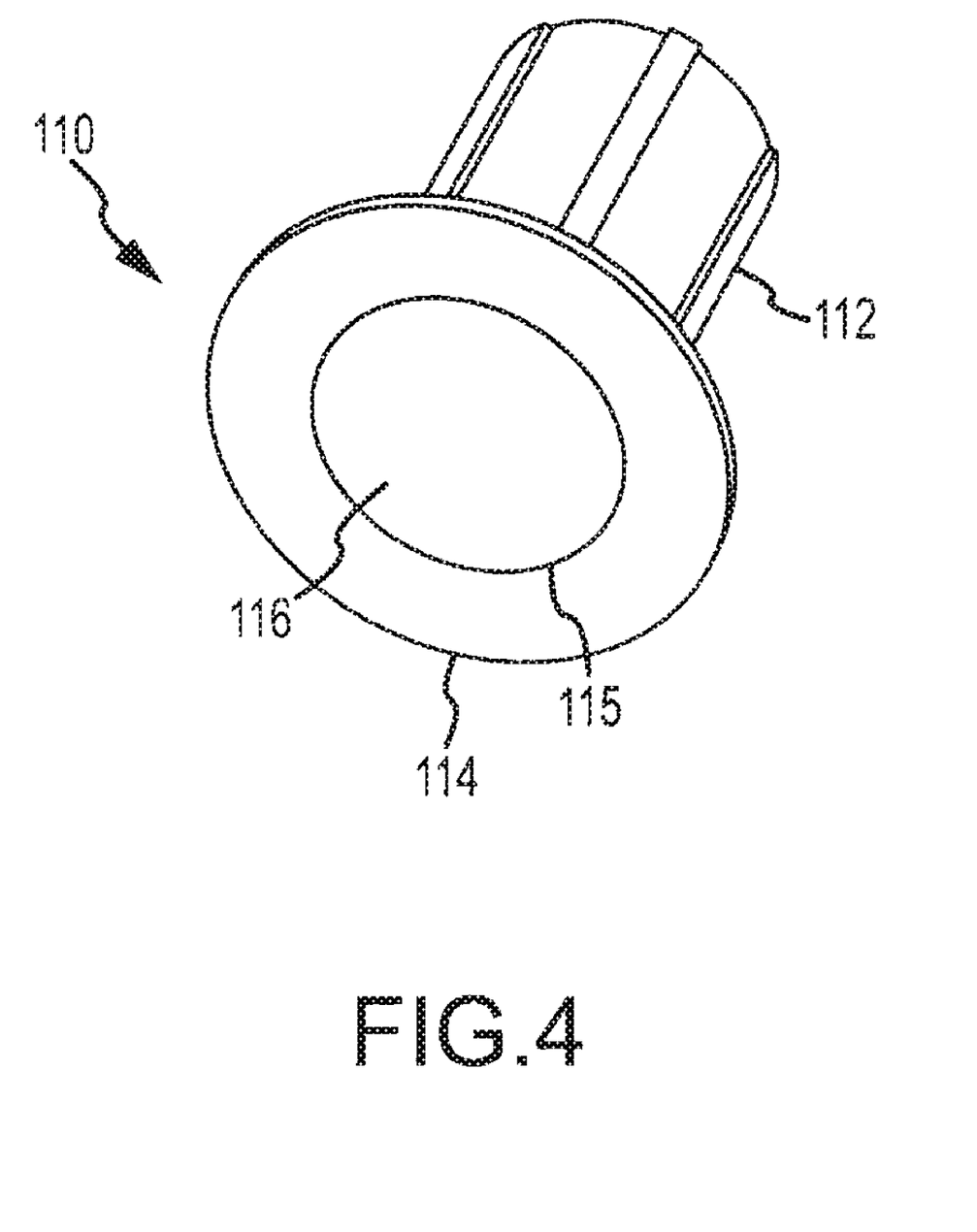
FIG. 4 is an end perspective view of an exemplary inner mold segment (or simply a mold or a mold shell) during initial preparation steps and showing a large access port provided in an end to allow layer insertion of one or more reinforcement elements (e.g., to form a reinforcement layer or assembly/structure) into the inner chamber or volume of the mold after an initial rotocasting step is used to form an outer wall (or layer) of the molded part.

With the above discussion in mind, it may now be useful to provide a more detailed discussion of an exemplary rotocast composite hybrid method 300 as shown in FIGS. 3A and 3B. Further explanation of various processing steps in method 300 is provided with reference to FIGS. 4-10. The method 300 begins at step 305 such as with selecting a part or product to be formed by the process 300, materials to be used for the part (e.g., which plastics or elastomers to be used, which materials to be used for reinforcement, and so on), strengths required, finished colors desired and whether such colors should be provided using molded-in color, desired finish for the product/part, choosing and testing operations of a rotocasting machine, and so on.

Figure 5:
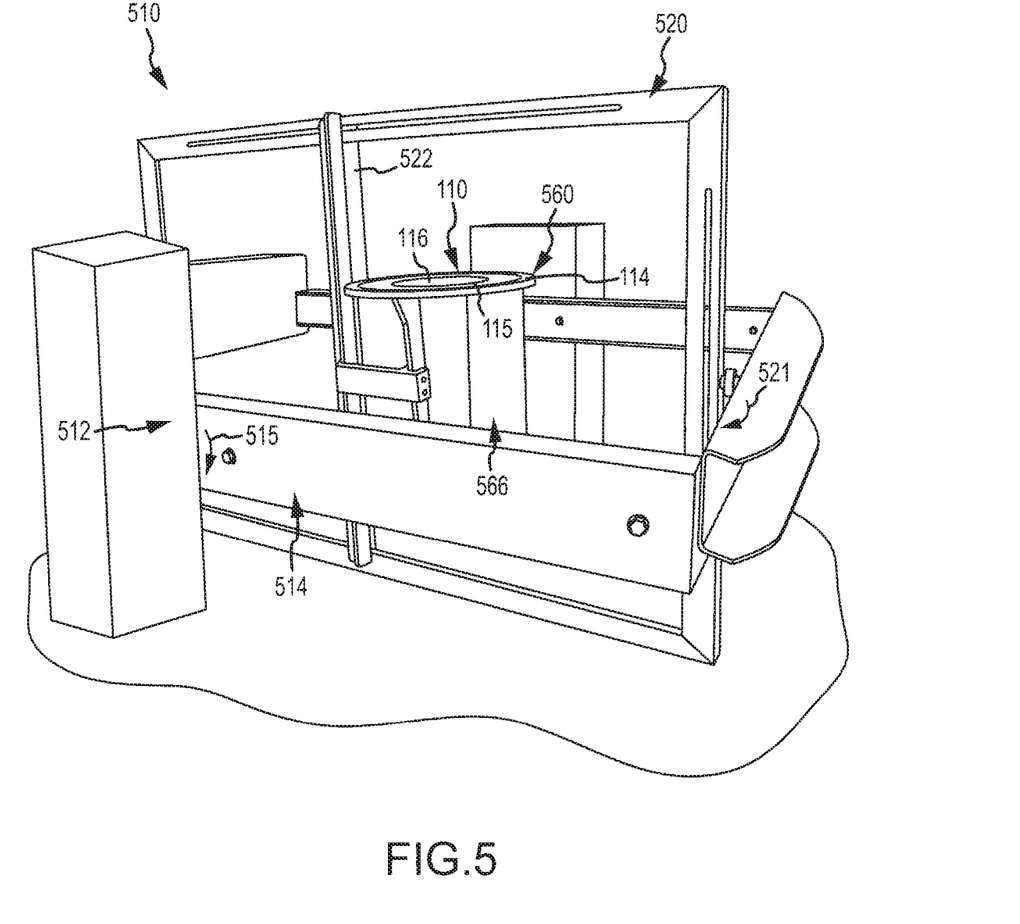
FIG. 5 illustrates a perspective view of a rotocasting ting machine in which the mold assembly has been mounted (e.g., prior to filling the mold and to operation to rotocast the outer wall) with the access port upward to receive a liquid resin.

With these preliminary steps/actions taken, the method 300 continues at 310 with providing (fabricating) a mold assembly for use in the rotocast composite hybrid method 300. For example, a silicone or similar tool may be fabricated as shown at 110 in FIG. 4 (as well as FIG. 1) along with a lid or cover 120 for sealing the access port or opening 115 (after pouring of resin into the shell/tool 110). Additionally, if a silicone or other soft mold is used, an outer mounting casing 560 (as shown in FIG. 5) may be fabricated to receive the soft mold 110 and to facilitate shape retention and mounting within a rotocasting machine. Alternatively, a rigid, multi-section mold may be used. The chamber or inner surfaces 116 of the tool 110 define the exterior shape(s) of each part/product that is molded using the mold assembly. For example, it may be useful to fabricate custom three-dimensional elements with the rotocast composite hybrid process 300 that require greater strength, stiffness, resistance to heat, and/or lighter weight than provided by typical rotocast parts.

For painted parts/products or molded-in color parts, using a silicone or similar mold as the inner mold segment would yield smooth, high quality cosmetic surfaces suited for painting or clear coating. A rigid outer shell would encase the soft inner mold so that the soft mold would retain the proper shape and would also aid in attaching the tool to the rotocasting machine. For other parts where the cosmetic look of the part is not important, though, it may be useful to use a rigid, segmented tool or inner mold segment because tool seams (and resulting ridges/lips) in the outer surfaces of the molded parts may be hidden or may be unimportant. As part of step 310, the tool or inner mold segment 110 may be prepared for use by cleaning the mold inner surface 116 via access port 115, and then the access port 115 may be used to spray a light coat of release agent (e.g., a universal-type mold release) on the inner mold surface 116.

In step 314, the mold sections or segments are assembled (if necessary) and then are clamped into the rotocasting machine. As shown in FIG. 5, the soft inner mold segment or tool 110 is inserted into an outer housing or segment 560 (if applicable) and the outer housing/segment 560 is clamped or mounted into the rotocasting machine 510. The rotocasting machine 510 may be any of a number of readily available rotocasting machines or devices that are useful for rotating a mold assembly, such as outer housing 560 with tool 110 and lid 120, about two axes (typically concurrently) or about X and Y axes. The machine 510 is shown to include a rotation/control assembly 512 that supports first frame 514 and second frame 520. The rotation assembly 512 (e.g., two orthogonally mounted rotation motors) supports and rotates the first and second frames about orthogonal axes (X-Y axes) that intersect in the mounted mold assembly. The rotation about these axes is shown with arrows 515, 521 in FIG. 5. The frame 520 may include a cross bar(s) 522 that may be used to mount or clamp, as shown at 566, the mold assembly including outer housing 560 (if applicable) and inner mold segment 110 into the machine 510.

As part of step 314, the rotocasting machine is operated (if/as necessary) to rotate the mold assembly until the access port or opening 115 is facing upward. The mold opening 115 is an area or portion that is trimmed off or removed from a molded part (e.g., removed when or soon after the lid 120 is removed to insert the reinforcement 140). This was explained with reference to FIG. 1 where it was explained that opening 138 is formed by removing an area or portion of the rotocasted materials when the lid 120 is removed to allow access to surface 139 to apply reinforcement 140. In other words, rotocast material on the lid 120 is removed adjacent the opening 115 (see step 346 of method 300) to give access to do a composite layup (see steps 350 and 360 of method 300). The opening 115 and opening 138 in skin coat/outer wall 132 of part 130 are large enough to allow a worker to reach their hands into the rotocast wall 132 to apply the reinforcement 140 to the inside surface 139.

In step 320, a resin is mixed for the outer wall(s) or skin coat 132 of part 130. For example, the resin may be a two-part resin such as an epoxy, polyester, urethane, polyurethane, or the like typically used in molding parts via rotocasting. The mixing instructions typically are set or provided by the manufacturer or such resins and should be followed in step 320. Many resins may be used to form the outer wall 132, and, in some cases, a two-part, room temperature polyurethane resin is typically used that has a gel time of less than about 30 minutes (e.g., 20 minutes or the like). In some cases, it is desirable to provide molded-in coloring or visual effect for the outer wall 132. In these cases, step 320 may also include adding an appropriate pigment, glitter, or casting powder.

Figure 6:
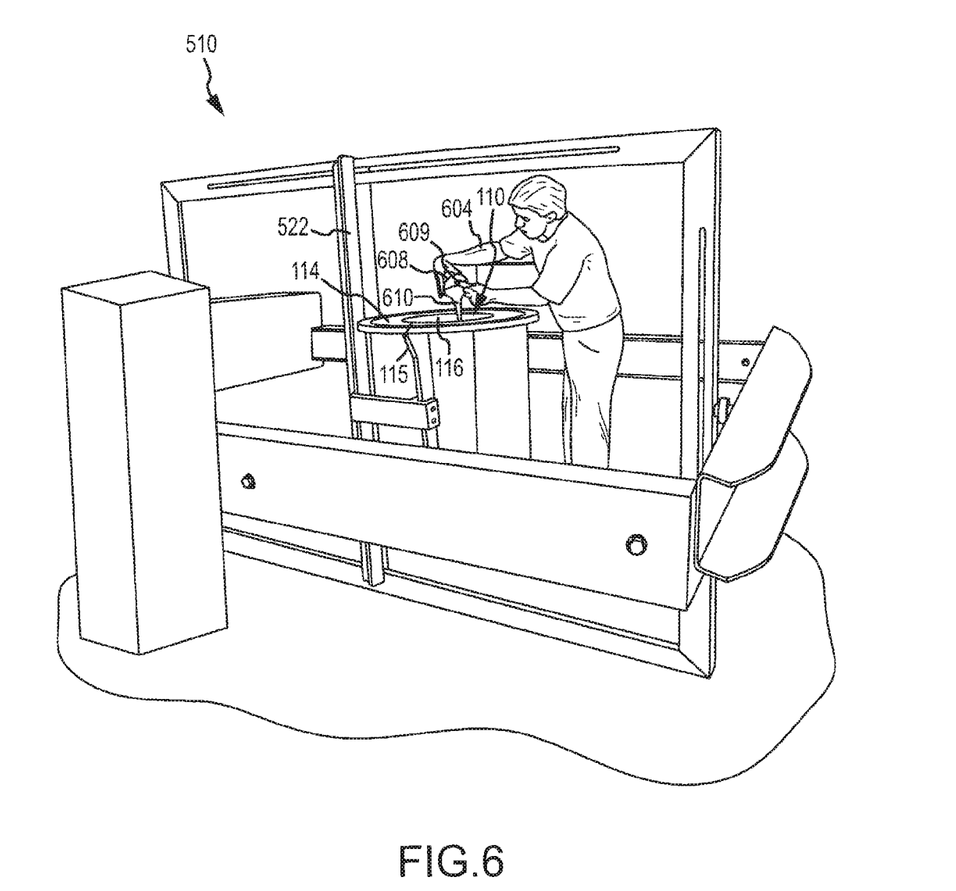
FIG. 6 illustrates pouring of mixed resin into the interior chamber of the mold within the rotocasting machine of FIG. 5.
Figure 7:
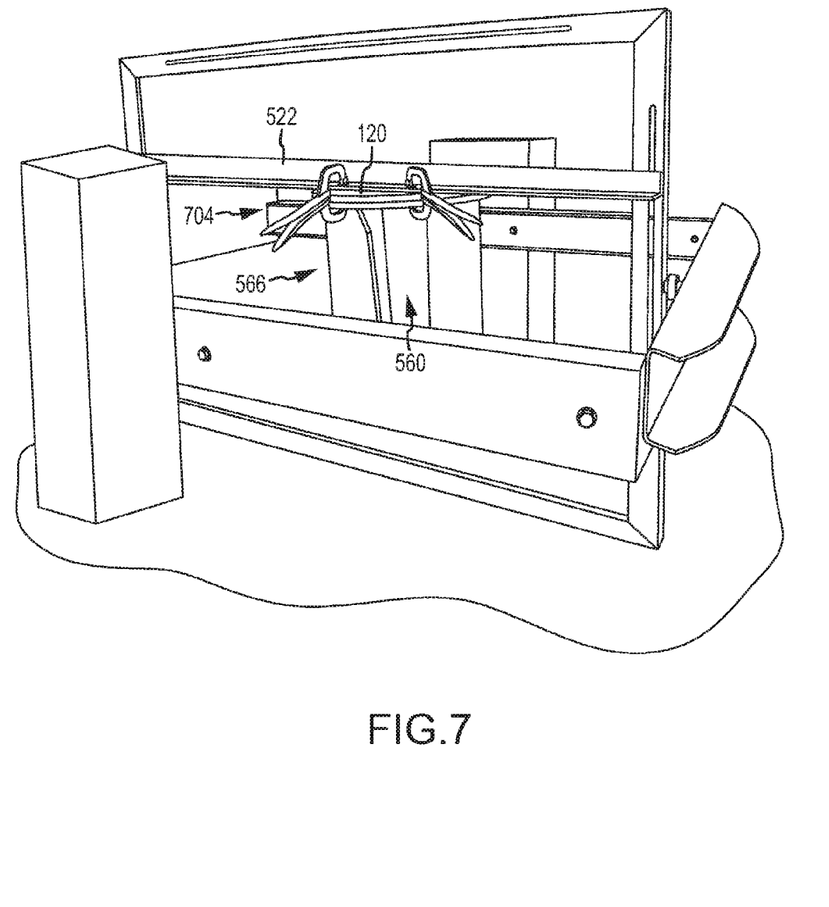
FIG. 7 illustrates the step of sealing the mold assembly after the pouring step of FIG. 6 with a lid or cap covering the access port of the mold.

In step 326, a volume of the mixed resin is poured into interior space or chamber of the inner mold segment or tool 110. This is shown in FIG. 6 with a worker shown pouring resin 610 from a mixing container 608 into the tool 110 via opening 115 and using a stirring tool or paddle 609 to assist in emptying the container 608. The amount or volume of resin 610 placed into the mold 110 may vary to practice the method 300 and, of course, will vary with the size of the part 130 being formed. In some cases, it may be desirable for the wall to be relatively thin (thickness, t1, being less than about 0.125 inches) such that the part is relatively lightweight. In any case, the volume of resin 610 is selected to obtain a desired thickness, t1, in the outer wall 132.

The method 300 continues with step 330 with the lid 120 being attached over the access port or opening 115 of inner mold segment 110. For example, the lid 120 may be a planar plate that matches the size and shape of (or is somewhat smaller or larger than) the mating plate/lip 114 of the inner mold segment 110, and the lid 120 may be clamped with clamps 704 shown in FIG. 7 to the mating plate 114 (and/or outer housing 560). The lid 120 is preferably designed such that when it is clamped to the tool 110 a seal is formed between the edge of opening 115 and abutting surfaces of lid 120 such that the liquid resin 610 does not leak out from the tool 110 when the mold assembly is rotated during operation of the rotocasting machine 510. Clamps 704 are shown as being useful to allow easy and quick attachment and removal of the lid 120 (e.g., allow prompt placement of reinforcement 140) but other connectors may be used such as screws/fasteners and/or a threaded cap/lid 120 that could be mated with housing 560 and/or plate 114.

The method 300 continues at 334 with rotating the mold 110 with rotocasting machine to coat the inner surfaces of the chamber as the resin gels so as to form the outer wall or skin coat 132 (e.g., rotation in X and Y axes to cause liquid resin to coat inner surfaces 116 of inner mold segment 110). Different mold shapes and sizes may require differing rotation speeds, and testing with a particular mold shape and size and/or a resin may be used to set and adjust the major and minor (X and Y (or Y and X)) axis speeds and direction of the rotocasting machine 510. Typically, the axis speeds of the machine will range between 1 and about 8 RPM (e.g., 2 to 3 RPM is sometimes a useful initial setting for the machine 510 to get adequate resin flow throughout the chamber of the mold 110). As shown at 340, the operation of the rotocasting machine 510 (or rotocasting) is continued until a rotation or rotocasting period has past. Generally, the mold 110 is rotated until the resin 610 has coated the inner surface 116 of the mold 110 and has also at least initially gelled (e.g., has gelled but is still tacky). Hence, the rotation time may be equal to or somewhat more than a gel time for the mixed resin 610 (e.g., 30 to 40 minutes when a manufacturer has set a 20-minute gel time for a particular two-part resin with all or a portion of the gel time used up with the operations of mixing, pouring, and placing the lid over the access port). In some applications, the mold 110 may be warmed in an oven for a set period of time to help the resin flow more readily or to speed the cure of the resin somewhat.

Figure 8:
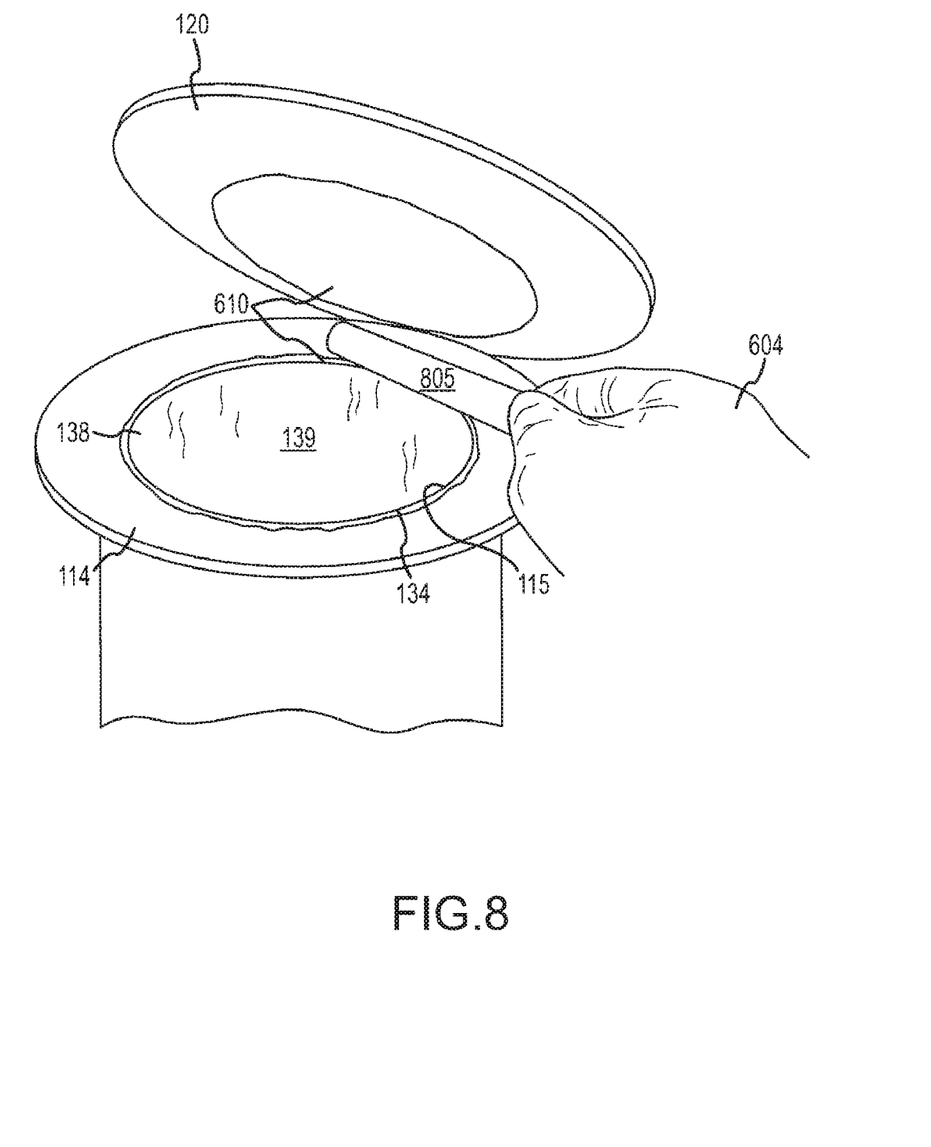
FIG. 8 illustrates the mold assembly after removal from the rotocasting machine and as the lid/cover is being removed and during the trimming of excess resin from the edges of the access port or mold opening.
Figure 9:
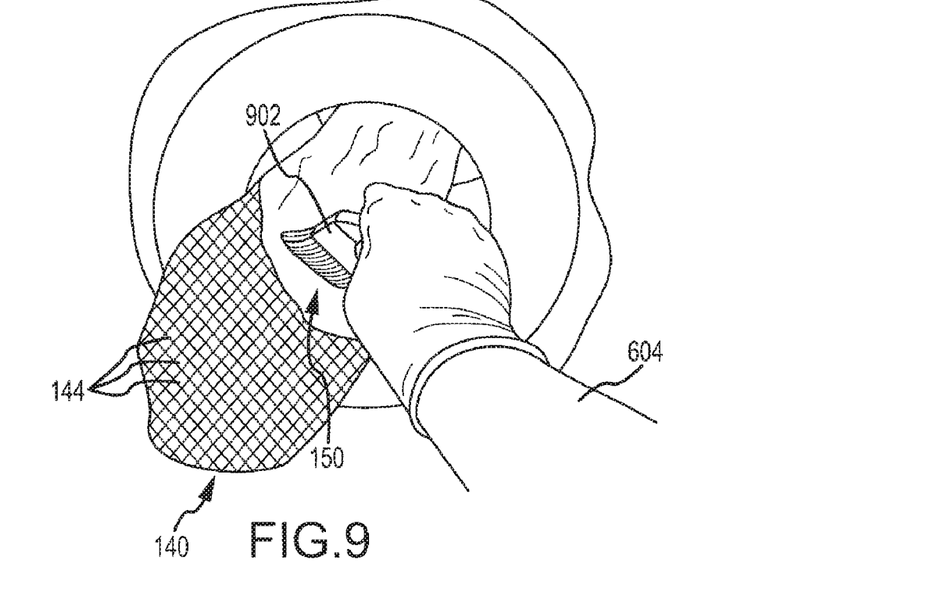
FIG. 9 shows the application of a ply of reinforcement using an additional volume of the same or a different resin as used for the skin coat (or outer wall), e.g., providing the reinforcing "layer" as well as the inner wall (skin lining) for the molded part/product.

At 346, after the rotation period has expired, rotation of the rotocasting machine 510 is stopped, and the mold assembly is removed from the machine 510. While the resin 610 forming the outer wall 132 is still soft (partially gelled and often still tacky), as shown in FIG. 8, the lid 120 is carefully removed from the inner mold segment 110. As shown in FIG. 8, removal of the lid 120 causes the removal of an end cap or area of the resin 610 to create opening 138 in outer wall 132 to allow access to inner surface 139 of sidewall 134. Step 346 may also include a worker 604 using a tool 805 (such as a tongue depressor or the like) to trim excess resin 610 from the edges of access port or opening 115 of plate 114, being careful to not pull the resin loose from the surface 116 of mold 110.

The method 300 continues at 350 with layup of one or more plies of reinforcement material 144 (e.g., formation of reinforcing layer 140) on the inside surface 139 of outer wall or skin coat 132 (or on the portions requiring added strength). Prior to step 350, the materials may be collected for performing the layup 350. This may include circles or strips of reinforcement fabric 144 and tools such as scissors, chip brushes, a mirror, and/or a light for allowing a worker 604 to see into the dark recesses of skin coat 132 (still in tool 110). As shown, in FIG. 9, the worker 604 may manually place or position one or more plies of material 144 on the surface 139 to form the reinforcement layer 140 (e.g., the material/fabric may be a weave or fabric of fiberglass, carbon, cotton, or the like), and then a scissors may be used to trim excess extending outside the opening 115 of mold 110. Layup in step 350 typically also includes using a brush 902 to apply resin to form inner or binding layer 150 (e.g., to bind the material 144 to the inner surface 139). This may be called wet layup of a composite layer including materials in "layers" 140 and 150 (which will overlap and/or blend) as the resin (which may be the same as resin 610 used to form outer wall 132) seeps into the reinforcement fabric 144 to bind or mate with surface 139. The brush 902 is used to more evenly apply the resin of layer 150, and its use results in a relatively thin layer of resin (e.g., polyurethane) that begins to gel upon its application in the composite/multi-layer part 130. Often, step 350 first involves brushing the inner surface 139 with a new coat of resin and then the cloth/fabric 144 is placed onto this wet resin of layer 150. The fabric is then wet again ("wet out") with additional resin using brush 902 (which causes layers 140 and 150 to be even more of a composite layer attached to outer wall 132).

If a smooth finish is desired on the inside of the part (e.g., on the inner surface of inner or binding layer 150), step 360 may be performed to smooth this surface. For example, after the fiberglass or other reinforcing material 144 is applied, a layer of peel ply may be applied to the inner surfaces of the binding/inner layer 150 to give the inside of the composite part 130 a smooth finish. The peel ply may be wet out with resin (e.g., additional volumes of resin 610 used to form outer wall 132 and/or the resin used to form layer 150). This also helps the reinforcement stay in intimate contact with the skin coat 132, particularly for a complex shape (rather than a simple cylinder 132) with a lot of curvature and/or corners. The resin is then allowed to cure at 370 (e.g., for a curing time period recommended by manufacturers of the resin(s)). If necessary, for a very complex shaped part, a vacuum bag may be employed to hold the reinforcement layer 140 and binding resin 150 in intimate contact with outer wall surface 132 while the resin is curing. This would eliminate any air pockets or voids between the outer wall 132 and the composite layer 140 and 150.

Figure 10:
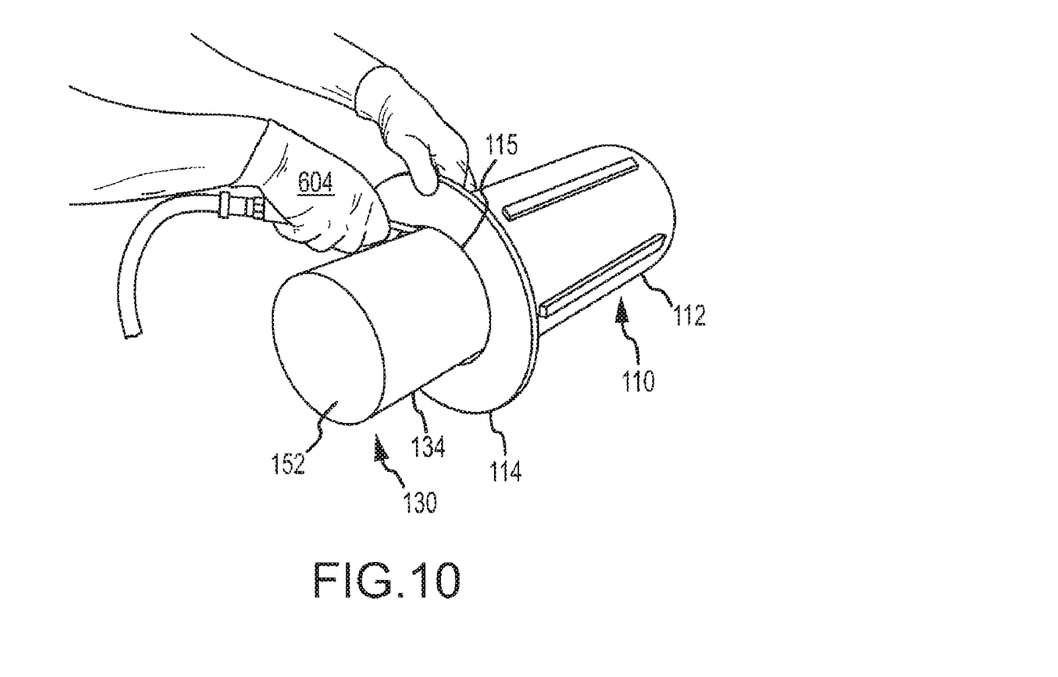
FIG. 10 illustrates the molded part after removal of the peel ply from the inner wall and during de-molding.

When the resin is cured at 370 (or afterwards such as the next day allowing the part 130 to cure overnight at room temperature, for example), the method 300 continues at 376 with (if applied) pulling off or otherwise removing the peel play from the inside surface of inner layer/binding layer 150. Then, as shown in FIG. 10, a worker 604 may proceed to de-mold 380 the cured part 130 from the inner mold segment 110. The part may be used "as is" or further finishing steps may be performed at 384 and 390. For example, sanding may be performed on the de-molded part 130 to remove flashing from parting seams if the mold 110 has multiple segments. Also, any pinholes or other irregularities may be cleaned up such as using resin with the same pigmented resin used on the skin coat 132. After any touch ups are allowed to cure, they may be sanded to flush them with the surface of part 130. In step 390, the part may be trimmed and its surface prepared for painting/clear coating, if necessary. Then, paint may applied (e.g., if no pigment was added in step 320) and/or a clear coat may be applied to achieve a desired sheen for the molded composite part 130. The method 300 then may end at 396.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The reinforcing material used to provide the reinforcing layer (e.g., layer 140 in the figures) may include fiberglass, an aramid fiber formed of long-chain polyamides (e.g., KEVLAR® or the like), carbon, or cotton fabric.

We claim:

1. A rotocast composite hybrid method, comprising:
   filling a mold with a volume of resin through an access port;
   sealing the access port by positioning a lid over the access port;
   mounting the mold in a rotocasting machine;
   operating the rotocasting machine to rotate the mold about two orthogonal axes, wherein a layer of the resin flows over an inner surface of the mold to form an outer wall of a part;
   removing the lid; and
   applying a reinforcement material to an inner surface of the outer wall of the part through the access port,
   wherein the resin is a two-part resin with a gel time and wherein the operating of the rotocasting machine to rotate the mold is performed for a time period exceeding the gel time and being less than a cure time or until the resin has gelled and the resin on the inner surface of the outer wall is soft and slightly tacky and
   wherein the applying of the reinforcement material comprises binding the reinforcement material to the inner surface by applying an additional volume of the resin to the reinforcement material, the additional volume of the resin and the volume of the resin provided in the filling step being cured without further rotating of the mold with the rotocasting machine.

2. The method of claim 1, wherein the two-part resin comprises polyurethane, epoxy, or polyester.

3. The method of claim 1, wherein the access port has a diameter of at least about 5 inches and wherein removing the lid includes removing a volume of the resin from the outer wall to form an opening in the outer wall to allow the applying of the reinforcement material.

4. The method of claim 1, further comprising applying a layer of peel ply to the resin applied over the reinforcement material and, after curing of the resin, pulling the peel ply from the part.

5. The method of claim 1, further comprising, after a cure period has elapsed, de-molding the part and applying a paint or clear coat to outer surfaces of the outer wall.

6. The method of claim 1, wherein the outer wall has a thickness less than about 0.125 inches and the reinforcement material comprises a woven fabric of strands of reinforcing material.

7. The method of claim 1, wherein the volume of resin comprises pigment, glitter, or casting powder such that the outer wall has a molded-in color or visual effect defined by the pigment, glitter, or casting powder.

8. The method of claim 1, wherein the reinforcement material comprises weave or fabric sheets of material adapted such that a portion of the additional volume of the resin seeps through the sheets to bind with a surface of the gelled volume of the resin providing in the filling step.

9. A method of fabricating a composite part, comprising:
providing a mold assembly including a tool defining an inner chamber and a cover for sealing an access opening to the inner chamber;
mounting the mold assembly within a rotocasting machine;
filling the inner chamber with a volume of a two-part resin that gels, after a gel time has elapsed, when mixed at room temperature;
after sealing the access opening with the cover, operating the rotocasting machine to cause the volume of resin to uniformly cover surfaces of the inner chamber of the tool;
after removing the cover and via the access opening, laying up a layer of reinforcing material on an inner surface of the resin covering the surfaces of the inner chamber, wherein the laying up of the layer of reinforcing material comprises mixing an additional volume of the resin, applying a first coating of the additional volume of the resin to the resin covering the surfaces of the inner chamber, placing the layer of reinforcing material on the first coating, and applying a second coating of the additional volume of the resin on the placed layer of reinforcing material; and
allowing the volume of the resin in the tool to cure without repeating the operating step and then de-molding the volume of resin and the reinforcing material from the tool in the form of the composite part.

10. The method of claim 9, wherein the laying up of the layer of reinforcing material is performed prior to expiration of a gel time for the volume of resin.

11. The method of claim 9, wherein the resin comprises a urethane, epoxy, or polyester or other two-part resin and wherein the reinforcing material comprises fiberglass, an aramid fiber formed of long-chain polyamides, carbon, or cotton fabric.

12. A method for molding a composite, elastomeric product, comprising:
providing a mold with an access port to an inner chamber;
filling the inner chamber with a volume of a two-part resin having a predefined gel time;
coating surfaces of the inner chamber with the two-part resin to define an outer wall of a product with a predefined thickness;
applying a reinforcing layer to an inner surface of the outer wall via the access port of the mold;
applying a binding layer over the reinforcing layer attaching the reinforcing layer to the inner surface of the outer wall of the product,
wherein the coating of the surfaces of the inner chamber includes mounting the mold in a rotocasting machine and operating the rotocasting machine to rotate the mold for a time period exceeding the predefined gel time and being less than a cure time or until the resin has gelled and the resin on the inner surface of the outer wall is soft and slightly tacky and
wherein the applying of the reinforcing layer comprises binding the reinforcing layer to the inner surface by applying an additional volume of the resin to the reinforcing layer, the additional volume of the resin and the volume of the resin provided in the filling step being cured without further rotating of the mold with the rotocasting machine.

13. The method of claim 12, wherein the access port has a dimension of at least about 5 inches and the method includes covering the access port with a lid prior to the coating step.

14. The method of claim 12, wherein the two-part resin comprises a two-part room temperature resin and wherein the binding layer comprises the two-part resin.

15. The method of claim 14, further comprising, after the applying of the binding layer and after a curing period for the two-part resin, removing the product from the inner chamber of the mold and applying a clear coat or paint to outer surfaces of the product.

16. The method of claim 12 wherein the predefined thickness is less than about 0.125 inches, wherein the coating comprises concurrently rotating the mold about two orthogonal axes for a time period less until the two-part resin has gelled, has stopped flowing, and is tacky, and wherein the volume of two-part resin further comprises a pigment, glitter, or casting powder such that the product has a molded-in color or visual effect.

* * * * *